(12) United States Patent
Alhussien et al.

(10) Patent No.: US 9,933,963 B1
(45) Date of Patent: Apr. 3, 2018

(54) OPEN BLOCK HANDLING TO REDUCE WRITE ERRORS

(71) Applicant: Seagate Technology LLC

(72) Inventors: Abdel Hakim Alhussien, Longmont, CO (US); Alex Tang, Cupertino, CA (US); Leonid Baryudin, Longmont, CO (US); Erich Franz Haratsch, San Jose, CA (US)

(73) Assignee: Seagate Technology, Longmont, CO (US)

( * ) Notice: Subject to any disclaimer, the term of this patent is extended or adjusted under 35 U.S.C. 154(b) by 0 days.

(21) Appl. No.: 15/446,576

(22) Filed: Mar. 1, 2017

(51) Int. Cl.
*G11C 16/04* (2006.01)
*G06F 3/06* (2006.01)
*G06F 12/02* (2006.01)

(52) U.S. Cl.
CPC ............ *G06F 3/0619* (2013.01); *G06F 3/065* (2013.01); *G06F 3/0625* (2013.01); *G06F 3/0659* (2013.01); *G06F 3/0679* (2013.01); *G06F 12/0253* (2013.01); *G06F 2212/702* (2013.01)

(58) Field of Classification Search
CPC ................ G11C 11/5628; G11C 16/06; G11C 2211/5641
See application file for complete search history.

(56) References Cited

U.S. PATENT DOCUMENTS

| | | | |
|---|---|---|---|
| 9,841,902 B2 * | 12/2017 | Baderdinni | G06F 3/061 |
| 2011/0302476 A1 | 12/2011 | Lee et al. | |
| 2012/0311402 A1 * | 12/2012 | Tseng | G06F 11/1048 714/763 |
| 2013/0128671 A1 * | 5/2013 | Shin | G11C 16/10 365/185.18 |
| 2014/0025874 A1 | 1/2014 | Kwon et al. | |
| 2014/0297919 A1 | 10/2014 | Nachimuthu et al. | |
| 2014/0297936 A1 | 10/2014 | Yu et al. | |
| 2015/0149698 A1 * | 5/2015 | Cai | G11C 11/5628 711/103 |
| 2015/0149840 A1 * | 5/2015 | Alhussien | H03M 13/1125 714/719 |
| 2015/0149871 A1 * | 5/2015 | Chen | G06F 11/1068 714/773 |
| 2015/0193302 A1 * | 7/2015 | Hyun | G11C 29/52 714/764 |
| 2016/0141044 A1 * | 5/2016 | Sun | G11C 16/10 365/185.11 |
| 2016/0216910 A1 | 7/2016 | Phan | |
| 2016/0232053 A1 | 8/2016 | Lin et al. | |
| 2016/0246807 A1 | 8/2016 | Yu et al. | |

(Continued)

*Primary Examiner* — Tuan T Nguyen
(74) *Attorney, Agent, or Firm* — Duft Bornsen & Fettig LLP; Sean J. Varley

(57) ABSTRACT

Systems and methods presented herein provide for open block handling of an SSD. In one embodiment, an SSD includes a buffer, and an MLC flash device. The SSD also includes a controller operable to write data in the buffer based on an Input/Output (I/O) request (e.g., from a host), to begin copying the data from the buffer to a block of the MLC flash device, to copy a portion of the data associated with open word lines of the block to another location in the buffer after a power cycle, and to update a lookup table for the copied portion of the data with the other location so that the copied portion of the data can be accessed via a subsequent I/O request.

21 Claims, 8 Drawing Sheets

(56) References Cited

U.S. PATENT DOCUMENTS

2016/0268000 A1\* 9/2016 Thompson .............. G11C 16/30
2016/0372184 A1 12/2016 Shalvi et al.
2017/0024279 A1\* 1/2017 Lu ........................ G06F 11/1068

\* cited by examiner

OPEN BLOCK HANDLING TO REDUCE WRITE ERRORS

FIELD OF THE INVENTION

The invention generally relates to Solid State Drives.

BACKGROUND

A variety of Solid State Drive (SSD) architectures exist, such as Single Level Cell (SLC) architectures and Multi-Level Cell (MLC) architectures (e.g., non-volatile NAND storage). An SLC architecture allows a memory cell to store one bit of data. Traditionally, an MLC architecture meant that a memory cell could store two bits of data. But, architectures have evolved and now provide even higher levels of density, such as Triple Level Cell (TLC) architectures that store three bits per memory cell and Quad Level Cell (QLC) architectures that store four bits per memory cell. So now, any architecture storing more than one bit of data per cell may also be referred to as a MLC architecture.

Generally, MLC architectures have higher read and write latencies than SLC architectures. But, their higher densities provide the advantage of smaller footprints in electronic devices. So, their use is rapidly increasing. Still, their latencies can be an issue. As such, some manufacturers may implement multiple architectures as part of a hybrid SSD such that the SSD can enjoy the advantages of each architecture.

SUMMARY

Systems and methods presented herein provide for open block handling of an SSD to reduce error propagation involved in closing open word lines. In one embodiment, an SSD includes a buffer, and an MLC flash device. The SSD also includes a controller operable to write data in the buffer (e.g., an SLC or an MLC with no open word lines) based on an Input/Output (I/O) request, to begin copying the data from the buffer to a block of the denser MLC flash device (e.g., MLC, TLC, QLC, etc.), to copy a portion of the data associated with open word lines of the block to another location in the buffer after a power cycle or after certain criteria are met, and to update a lookup table for the copied portion of the data with the other location so that the copied portion of the data can be accessed via a subsequent I/O request. Some criteria to recycle data into the buffer might include the read count accumulated by an associated open MLC block, the time since the associated MLC block has been written as observed by a counter, or read error measurements of the associated MLC block done periodically or after waking from power down.

The various embodiments disclosed herein may be implemented in a variety of ways as a matter of design choice. For example, the system and method embodiments hereof may take the form of computer hardware, software, firmware, or combinations thereof. Other exemplary embodiments are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
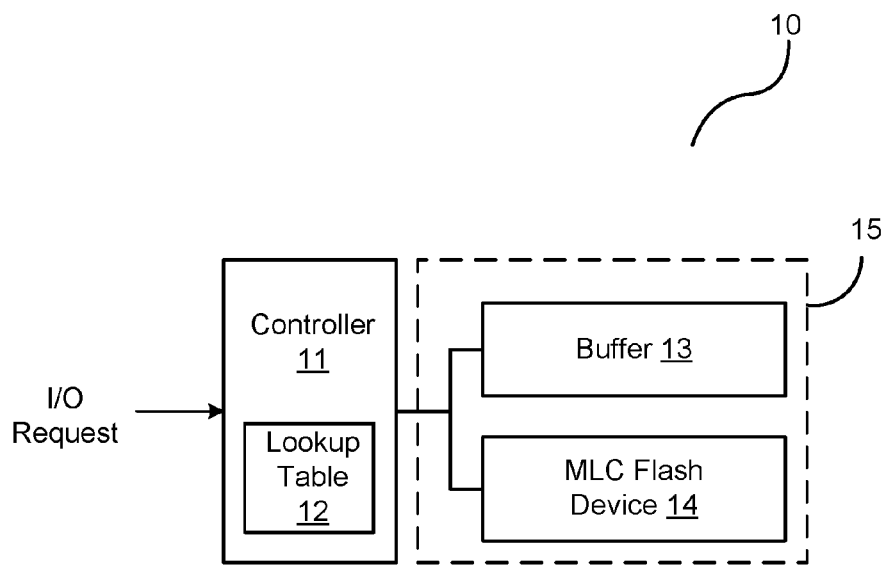
FIG. 1 is a block diagram of an exemplary SSD that handles writing when blocks are open.

FIG. 1 is a block diagram of an exemplary SSD 10 that handles writing when word lines of a flash device are open during a power cycle. The SSD 10 comprises an SSD controller 11 that is operable to process I/O requests (e.g., from a host system, not shown) directed to a storage device 15 of the SSD 10. In this embodiment, the storage device 15 comprises a buffer 13 and an MLC flash device 14. The buffer 13 operates as a staging buffer to quickly write data of write I/O requests to the storage device 15. The SSD controller 11 then transfers data from the buffer 13 to the MLC flash device 14, for example, when it deems certain data of the buffer 13 is better suited for longer-term storage (e.g., based on firmware operable with the SSD controller 11). Of course, the buffer 13 may also be used to store more often/shorter-term storage for the SSD 10.

The SSD 10 may also handle open word lines of a flash device after certain criteria are met. Such criteria may include the recycling of data into the buffer based on the read count accumulated by an associated open MLC block, the time since the associated MLC block has been written as observed by a counter, or read error measurements of the associated MLC block done periodically or after waking from power down. These criteria may be used to address read disturbs, data retention, and the like that may cause voltage shifts within the memory cells of the MLC flash device 14.

Typically, each memory cell of a flash device is configured like a Metal Oxide Semiconductor Field Effect Transistor (MOSFET) with a control gate. But, each memory cell also has a floating gate surrounded by an insulating oxide layer configure between the control gate and the channel of the MOSFET. Because the floating gate is electrically isolated by its insulating layer, electrons placed on it are trapped until they are removed by an application of an electric field (i.e., an applied voltage). Placing electrons on the floating gate sets the transistor to the logical "0" state. Once the floating gate is charged, the electrons in it screen the electric field from the control gate, thereby increasing the threshold voltage of the memory cell. This means that a higher voltage is applied to the control gate to make the channel of the transistor conductive.

In order to read a value from the transistor, an intermediate voltage between the threshold voltages is applied to the control gate. If the channel conducts at this intermediate voltage, the floating gate is uncharged and causes a logical "1" to be stored in the memory cell. If the channel does not conduct at the intermediate voltage, it indicates that the floating gate is charged causing a logical "0" to be stored in the memory cell. The presence of a logical "0" or a logical "1" is sensed (i.e., "read") by determining whether there is current flowing through the transistor when the intermediate voltage is asserted on the control gate.

Regardless of the architecture (i.e., SLC or MLC), the memory cells of a flash device are generally arranged in pages typically comprising thousands of cells in a single page. For example, a single page of an SLC flash device may comprise 16,384 memory cells capable of storing 16,384 bits of data, or 16 kilobytes (kB). A single page of a 2-bit MLC flash device may comprise 8,192 memory cells capable of storing the same amount of data. Typical page sizes include 2 kB, 4 kB, 8 kB, and 16 kB. The pages of a flash device are arranged in blocks with each block routinely comprising 128 or 256 pages. Thus, each block in a flash device can vary between 256 kB and 4 megabytes (MB). When data is to be written to a flash device, the SSD controller 11 programs the device on a page-by-page basis until a block is full. Once the block of a flash device is full, the block is closed until the SSD controller 11 performs an erasure process on the block. However, it should be noted that the invention is not intended to be limited to any page size or block size as these features are constantly changing as the technology progresses.

As mentioned, SSDs now employ multiple architectures, including SLC architectures and MLC architectures. An SLC architecture increases I/O performance, whereas an MLC architecture increases data storage density. In this regard, the SSD 10 may employ an SLC architecture as the buffer 13 to quickly handle write I/O requests to the SSD 10. And, when the SSD controller 11 determines that certain data within the buffer 13 would be more suitable for longer-term storage, the SSD controller 11 may transfer that data from the buffer 13 to the MLC flash device 14.

While flash devices of an SSD provide nonvolatile storage of data, it is common for SSDs to experience power failures during the writing process. And, a problem can present itself when data is being transferred from the buffer 13 to the MLC flash device 14 during a power cycle. For example, when the SSD controller 11 of the SSD 10 is transferring data from the buffer 13 to the MLC flash device 14, the block of the MLC flash device 14 is "open" as are certain word lines in the block. If the SSD 10 experiences a power failure during this time, the SSD 10 may leave the block open and thus leave certain word lines of a block open that have not been completely written (i.e., fully programmed). The block can be open for an extended amount of time that results in charge degradation of the open block which could impact the rate of write errors when the block is later closed.

More specifically, when writing to an MLC flash device, the SSD controller 11 may perform multiple programming passes to program a word line. If the multi-step programming process is not completed, memory cells associated with these open word lines can experience a variable charge due to leakage caused by, for example, high ambient temperatures. This charge degradation is exasperated if the block has experienced a large number of reads before its fully programmed.

When power returns (i.e., "cycles"), the SSD controller 11 may attempt to continue writing to the block since it was still open when the power failed. So, as part of a "safe shutdown" mode (e.g., a controlled shutdown), the SSD controller 11 closes the block and the open word lines in this process, and in the process read errors can propagate into write errors in the MLC block (e.g., read errors as part of a multi-pass program process). This creates the potential for "hard" errors in some data already stored in of the MLC flash device 14 because of charge leakage of the memory cells. That is, when the word lines close, the bits in the associated memory cells are internally read incorrectly without being passed to the controller ECC and, as such, the wrong state is eventually written to the MLC block.

The SSD 10 overcomes these problems by reusing data of a write I/O request in the buffer 13 after a power cycle (or in another block of the MLC flash device 14 that employs one step programming). For example, the SSD controller 11 processes a write I/O request to store data in the MLC flash device 14. In doing so, the SSD controller 11 writes the data to the buffer 13 and begins transferring that data to the MLC flash device 14, keeping track of pointers associated with the data in a lookup table 12 such that the data can be read later on (e.g., such that reads of the data can be serviced from the buffer 13 and/or from the MLC flash device 14). After the power cycle (or after certain criteria is satisfied), the data remaining in the buffer 13 that was associated with open word lines in the MLC flash device 14 is retained in the buffer 13. And, so that it can be read from the buffer 13 afterwards, the SSD controller 11 updates pointers to that data in the lookup table 12.

Based on the foregoing, the SSD controller 11 is any device, system, software, firmware, or combination thereof operable to service I/O requests to read data from and write data to the storage device 15. The MLC flash device 14 is any multidimensional flash device comprising memory cells, each of which is operable to persistently store multiple bits of data. For example, the MLC flash device 14 may comprise memory cells that each store two bits of data (traditionally referred to as MLC flash), three bits of data (commonly referred to as TLC flash), four bits of data (commonly referred to as QLC flash), or more. The buffer 13 is any device capable of staging data storage to the MLC flash device 14. In one embodiment, the buffer 13 is an SLC flash device comprising memory cells that each persistently store a single bit of data. In another embodiment, the buffer 13 is an MLC device that programs two bits to memory cells in a word line in one step while the MLC flash device 14 is a TLC device that requires multiple steps to store 3 bits in a word line, and therefore having open word lines if open at any point. In whatever configuration, the buffer 13 is nonvolatile and is generally configured for one step programming. An SLC architecture for the buffer 13 may have advantages in that SLCs are more robust in terms of read disturbs and retention. In some embodiments, the buffer 13 is configured within the same flash die as the MLC flash device 14. For example, the buffer 13 may be reserved as a portion of a single MLC flash device and may be configured as either SLC or MLC.

Figure 2A:
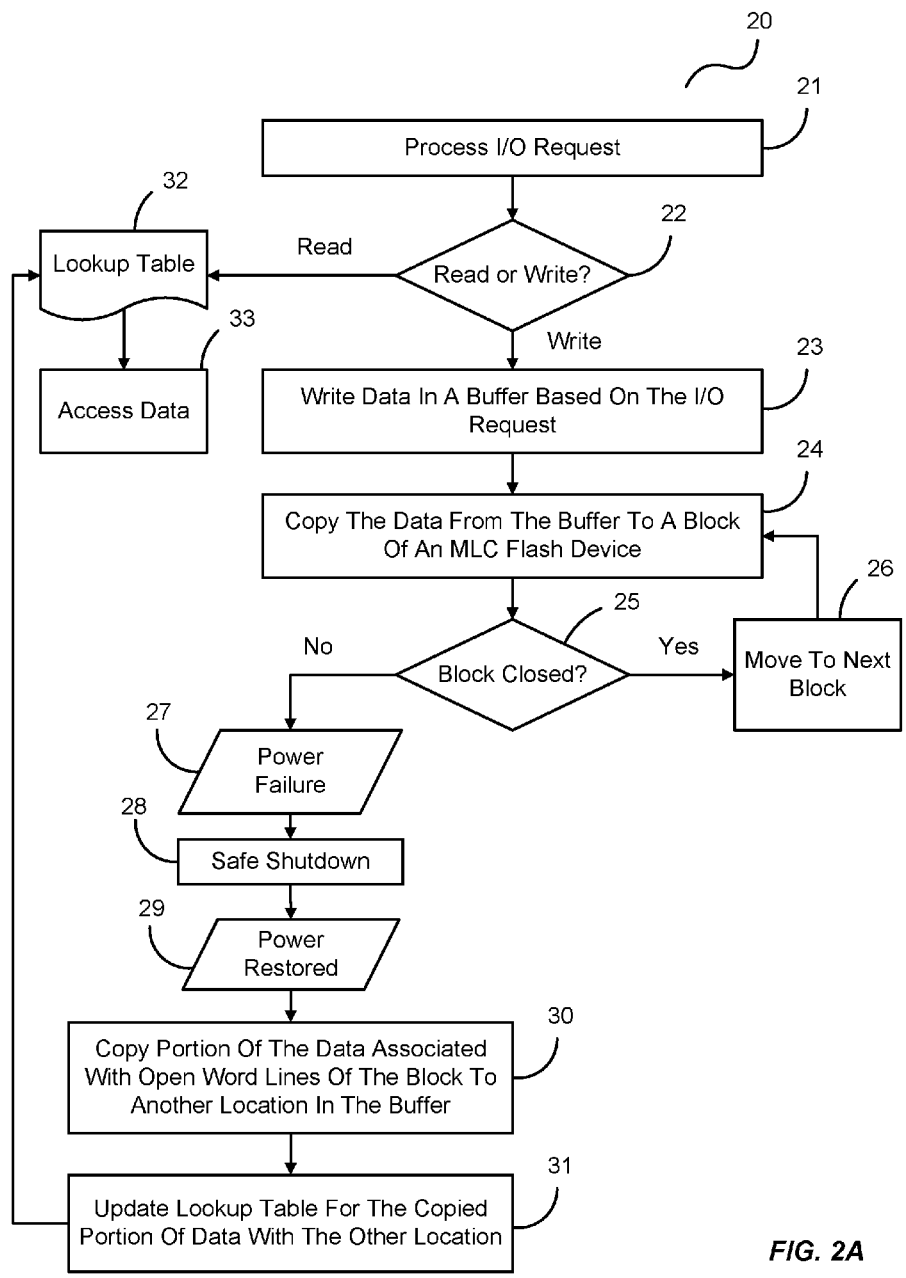
FIG. 2A is a flowchart of an exemplary process of the SSD of FIG. 1.

FIG. 2A is a flowchart of an exemplary process 20 of the SSD of FIG. 1. In this embodiment, the SSD controller 11 receives an I/O request (e.g., from a host system), in the process element 21. The SSD controller 11 then determines whether the I/O request is a read I/O request or a write I/O request, in the process element 22. If the I/O request is a read I/O request, the SSD controller 11 then looks to the lookup table 12 to find where the data is located (e.g., in the buffer 13, the MLC flash device 14, or a combination thereof), in the process element 32. The SSD controller 11 then accesses the data, in the process element 33. If on the other hand the I/O request is a write I/O request, the SSD controller 11 writes the data to the buffer 13, in the process element 23.

The SSD controller 11 then begins copying the data from the buffer 13 to a block of the MLC flash device 14, updating the pointers to the locations of the data in the lookup table 12 along the way, in the process element 24. The SSD controller 11 then determines whether the block of the MLC flash device 14 is closed, in the process element 25. If the block is closed, the SSD controller 11 begins copying the data to the next block of the MLC flash device 14, in the process element 26, and continues copying the data, in the process element 24, again updating the pointers to locations of the data in the lookup table 12. If the block of the MLC flash device 14 is not closed, the SSD controller 11 continues writing to the current block of the MLC flash device 14. At this time, the SSD 10 may experience a power cycle. That is, the power may fail, in the process element 27, and the SSD controller 11 performs a safe shutdown, in the process element 28, to protect the data already fully written to the MLC flash device 14. Of course, this safe shutdown process may occur after power is restored, for example, in the case where the SSD 10 has no backup power (e.g., an ultra-capacitor, a super capacitor, a holdup capacitor, a battery, etc.).

However, as mentioned, certain word lines of the open block may be vulnerable to data corruption and those word lines may exhibit an unknown amount of charge degradation if the drive is powered down for extended time intervals. If we continue to copy pages from the buffer 13 to the MLC flash device 14, then closing the open word line will involve internally reading the other bits in the cell of the open word line. Internal reading without ECC correction at the controller will propagate errors to the closed word line. To prevent propagating soft errors in the open word line to hard errors in the closed word line, the SSD controller 11 copies a portion of the data associated with the open word lines of the block to another location in the buffer 13, in the process element 30. Then, the SSD controller 11 updates the lookup table 12 for the copied portion of data at the other location in the buffer 13, in the process element 31. This renders the original data in the open word line invalid and any subsequent I/O request will be henceforth directed to read the data from the new location in the buffer 13 or the associated word lines in the MLC flash device 14 if deemed safe.

In other words, the data associated with the open word lines of the previously opened block in the MLC flash device 14 is recycled (e.g., rewritten) to another location in the buffer 13. The pointers of the lookup table 12 are then updated with the new location in the buffer 13 in the lookup table 12. Accordingly, when the SSD controller 11 processes a read I/O request for the data written to the previously opened word line, the SSD controller 11 can access the lookup table 12, retrieve the good data from the MLC flash device 14 and the data associated with the open word lines from the buffer 13, and service the read I/O request with contiguous good data. And, the SSD controller 11 can continue writing that data to another word line of the MLC flash device 14.

Figure 2B:
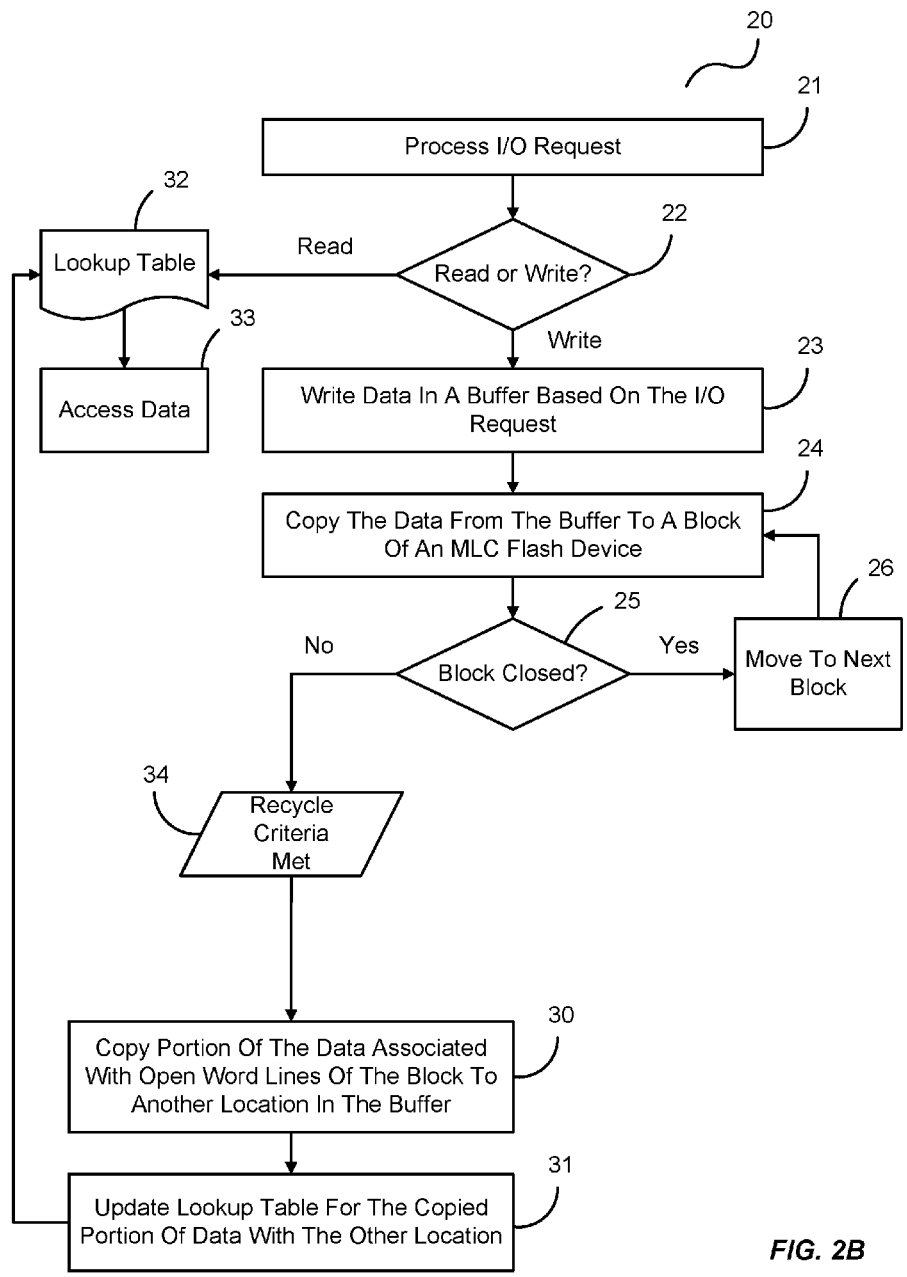
FIG. 2B is a flowchart of another exemplary process of the SSD of FIG. 1.

FIG. 2B is a flowchart of another exemplary process 20 of the SSD of FIG. 1. This process is essentially the same as the process 20 of FIG. 2A except for the criteria being met for recycling data into the buffer 13, in the process element 34. For example, if the block of the MLC flash device 14 is open for writing thereto, the SSD controller 11 may determine that data at certain word lines may need to be recycled into the buffer 13 based on a read count accumulated by an associated open MLC block. The SSD controller 11 may also use other criteria to recycle data, such as the time since the associated MLC block has been written as observed by a counter, read error measurements of the associated MLC block done periodically or after waking from power down, and the like. This embodiment may be implemented as either an alternative embodiment to that of FIG. 2A or as an additional embodiment to that of FIG. 2A.

It should also be noted that the I/O requests can and often do come directly from a host system. However, I/O requests may be cached in another device before arriving at the SSD 10. The I/O requests may even be cached within the SSD 10 before being executed or even be issued by other SSDs themselves. Accordingly, the invention is not intended to be limited to any particular type of I/O request.

Figure 3:
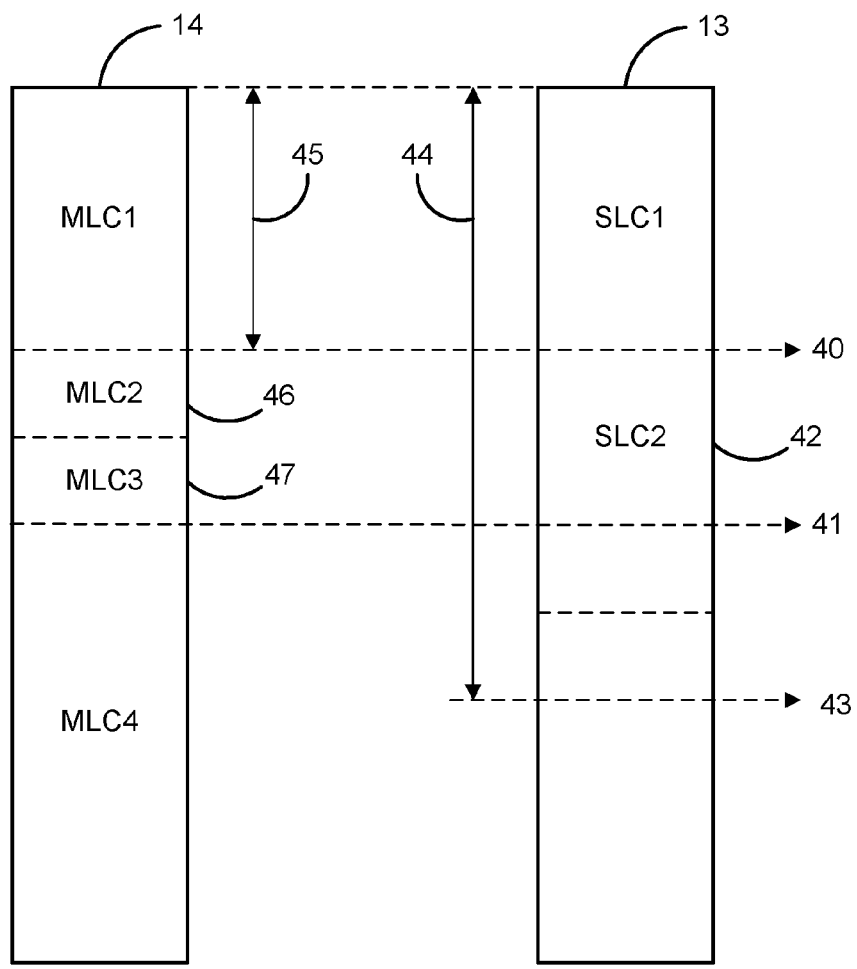
FIG. 3 is a block diagram of exemplary devices employed in the SSD of FIG. 1.

FIG. 3 is a block diagram of the buffer 13 and the MLC flash device 14 employed in the storage device 15 of the SSD 10 of FIG. 1 in an exemplary embodiment. In this embodiment, the staging buffer 13 is an SLC flash device and the MLC flash device 14 comprises memory cells that each store two bits of data. And, for the purpose of this illustration, the copy process is performed with respect to a power cycle, although it may be used on the aforementioned criteria. Again, the MLC flash device 14 may be implemented in a variety of ways as a matter of design choice (e.g., TLC, QLC, etc.). A two bit memory cell MLC flash device is used herein merely for the purposes of illustration to aid one skilled in the art in understanding the concepts described herein. Open word lines in the MLC device may occur if a multistep programming algorithm is used in writing the device. In other embodiments, the buffer 13 can be a single bit per cell SLC device or an MLC device that employs a single programming step that has no occurring open word lines if the buffer contains open blocks.

In this embodiment, the SSD controller 11 is in the process of transferring data from the staging buffer 13. As the staging buffer 13 is an SLC device and the MLC flash device 14 is a two bit memory cell device, the staging buffer 13 uses twice as many word lines as the MLC flash device 14 for the same amount of data. For example, the data SLC2 at region 42 of the staging buffer 13 occupies four word lines in the staging buffer 13 and is copied to the two word lines 46 and 47 (data MLC2 and data MLC3, respectively). As the data is copied from the staging buffer 13 to the MLC flash device 14, data written in the staging buffer 13 prior to SLC2 (i.e., SLC1) can be erased as the associated copy in MLC1 is considered safe. Before that point, I/O requests can be directed to SLC1 until data there is erased or if the lookup table 12 points to both SLC1 and MLC1. The lookup table should contain only one pointer when data is deemed safe after copying to the MLC flash device 14.

The data MLC1 in the MLC flash device 14 at the region 45 has been copied from the staging buffer 13 and is therefore considered "fully programmed" or safe. The data at the region 45 of the MLC flash device 14 is considered good and the pointer 40 in the staging buffer 13 is considered the "safe pointer". The pointer 41 is considered the "copy pointer" which is currently being used to transfer/copy the data from the staging buffer 13 to the word lines 46 and 47 of the MLC flash device 14. And, for the purposes of this illustration, the data in the region 44 in the staging buffer 13 is considered fully programmed in the SLC device. Thus, the pointer 43 is considered the "write pointer" indicating that all of the fully programmed data of the staging buffer 13 is to be written to the MLC flash device 14 by the SSD controller 11.

When programming a flash device, firmware of the SSD controller 11 performs various programming operations to ensure the data is correctly stored. For example, the SSD controller 11 may first apply a course programming operation on the MLC flash device 14 using a first voltage to write the data from the word line 42 of the staging buffer 13 to the MLC flash device 14. Then, the SSD controller 11 may apply a fine programming operation on the MLC flash device 14 using a second voltage to ensure the data is written well enough that it can be retrieved using a low density parity check (LDPC) or any other error correction code (ECC). Also as long as the SSD controller 11 has the data in MLC1 and SLC1 is not erased, any failure to read data in SLC1 can result in attempting to read the data in MLC1, or vice versa.

In this illustration, the SSD controller 11 is in the process of programming the word line 46 in the MLC flash device 14 with the fine programming operation as the course programming operation is complete. And, the SSD controller 11 is in the process of programming the word line 47 of the MLC flash device 14 with the course programming operation. Thus, these two word lines 46 and 47 of the MLC flash device 14 are vulnerable to data corruption in the event of a power cycle and any soft errors accumulated during safe shutdown can propagate to hard errors after the fine programming step is completed. Any data at these word lines is considered unsafe in that the data cannot be trusted as written correctly.

Figure 4:
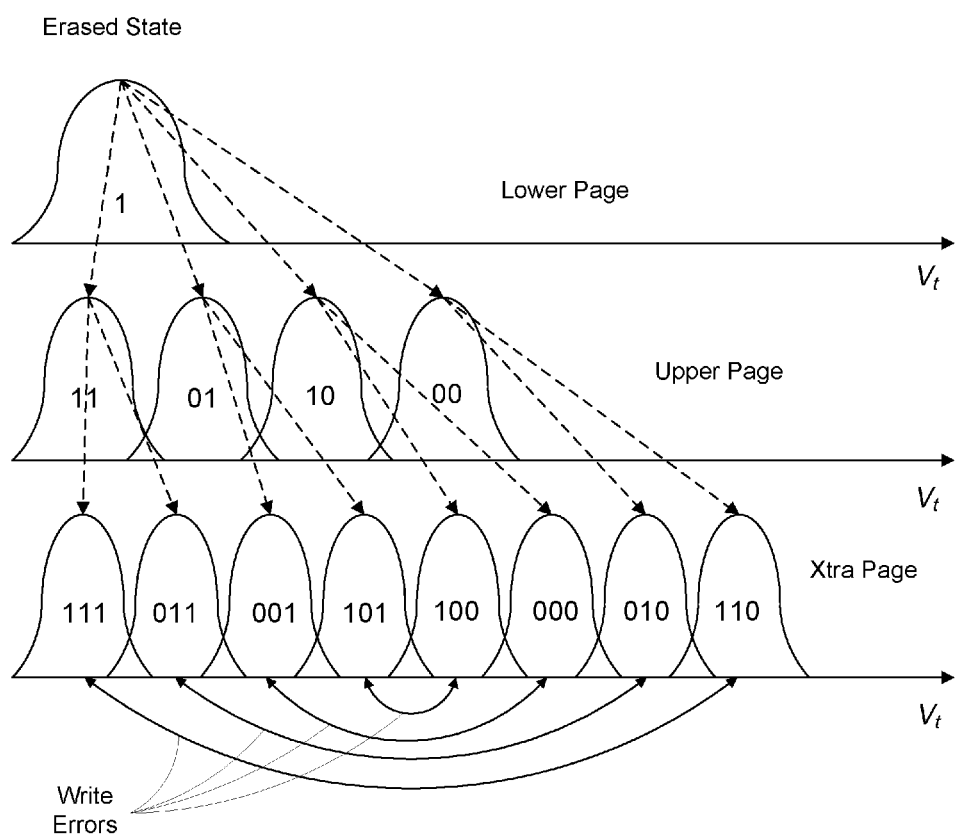
FIG. 4 is a diagram illustrating how errors can occur when a word line of a flash device in the SSD is open.

FIG. 4 illustrates how errors can occur when a block of the MLC flash device 14 is open during a power cycle. In this embodiment, the MLC flash device 14 is a TLC flash device where each memory cell in the device stores three bits. The memory cells are arranged in "lower pages" (LP) having two voltage states to program from the erased state (i.e., logical "1"), "upper pages" (UP) having four voltage states to program from the erased state, and "extra pages" (XP) having eight voltage states to program from the erased state.

The SSD controller 11 may make several programming passes of the LPs, the UPs, and the XPs. Generally, the first programming pass of the MLC flash device 14 is the same throughout the pages. Thus, when a power cycle occurs during these programming passes while the block of the MLC flash device 14 is open, soft read errors can propagate from reading the erased state of the LPs creating "high reliability errors" (HREs) when writing the UPs and the XPs. Errors can propagate because the flash device itself will read the cell voltages internally and use this information together with the UP data and/or the XP data to program a word line. The internal reads by the device do not have error correction and so any "soft" read errors can become "hard" errors, or HREs. For example, for the reasons mentioned above: the "101" bits in which LP=1 can be written as "100" in which LP=0, i.e., a hard error, and vice versa; the "001" bits can be written as "000", and vice versa; the "011" bits of the LP can be written as "010", and vice versa; and, the "111" bits can be written as "110", and vice versa. HREs are difficult to recover with the LDPC because the LDPC believes the data to be safe or good/reliable.

Figure 5:
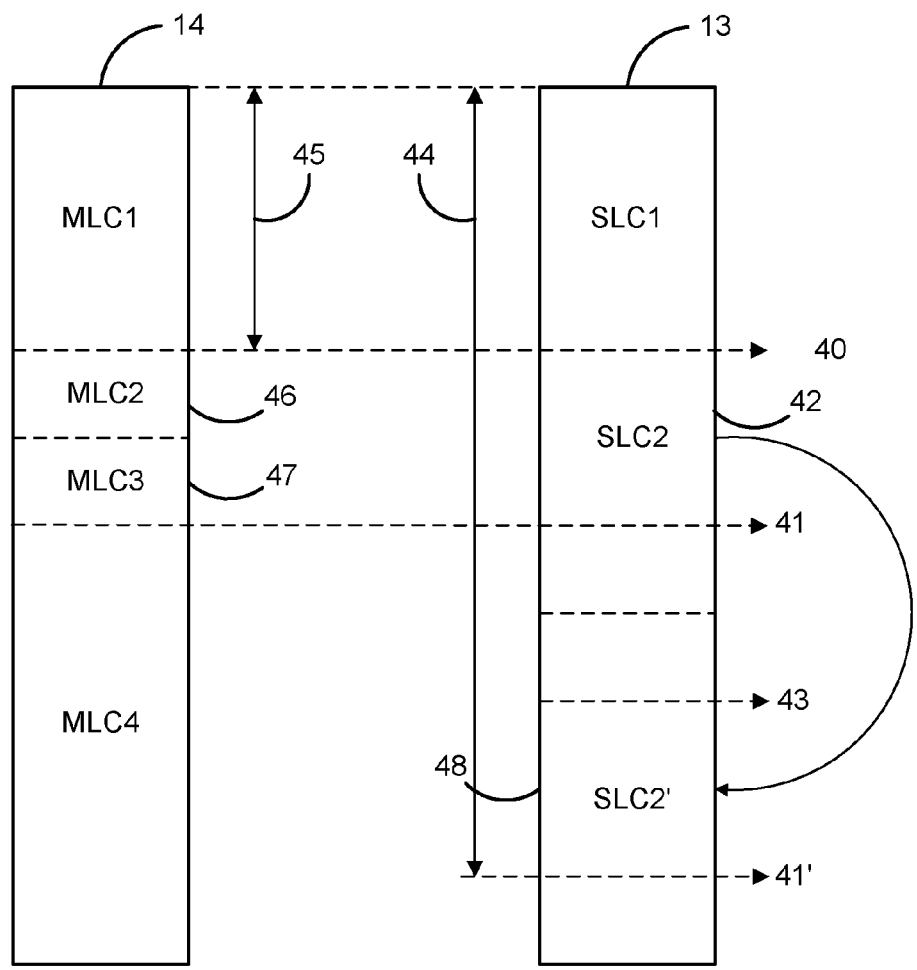
FIG. 5 is another block diagram of the flash devices of FIG. 3 illustrating how to overcome the errors of FIG. 4.

FIG. 5 is another block diagram of the flash devices of FIG. 3 illustrating how to overcome the errors of FIG. 4. In this embodiment, when power returns, the SSD controller 11 may continue writing to the block of the MLC flash device 14 but abandons the word lines 46 and 47 of the MLC flash device 14, as such can be cleaned up during "garbage collection". The SSD controller 11 copies the data SLC2 in the word lines of region 42 of the staging buffer 13 to the word lines of region 48 as the data SLC2', and updates the pointer to that data in the lookup table 12. Thus, when power returns (or the aforementioned criteria is met), the SSD controller 11 can continue copying from the copy pointer 41 to the write pointer 43 of the fully programmed area of the staging buffer 13 to a new word line in the MLC flash device 14. And, the SSD controller 11 advances the copy pointer 41 to the copy pointer 41', essentially extending the fully programmed area of the staging buffer 13 and creating a new write pointer in the lookup table 12 from which data can be transferred to the new word line of the MLC flash device 14.

Previously, upon a safe shutdown, the SSD controller 11 would "trash" the entire block of the MLC flash device 14 being written to by the staging buffer 13 and then rewrite the data to a new block. However, due to the write latencies of MLC flash devices, that previous process would be very time-consuming and incur considerable write amplification if the MLC block needs to be closed first. This new process allows the SSD controller 11 to ensure that the data from the staging buffer 13 is correctly written to the MLC flash device 14, albeit in different word lines of the MLC flash device 14, while reducing the overall time to complete the programming of the MLC flash device 14 from the staging buffer 13.

This allows the SSD controller 11 to service read I/O requests to the data of the previous write I/O request from either the staging buffer 13 during programming of the MLC flash device 14 or from the MLC flash device 14 itself after the new word line is fully programmed based on the new pointers in the lookup table 12. For example, once data in the MLC flash device 14 is deemed safe, I/O requests can be directed to that data in either the MLC flash device 14 or the staging buffer 13. Typically, in the case of an SLC device being used for the staging buffer 13, the data is erased in the staging buffer 13 once it is deemed safe in the MLC flash device 14 such that the staging buffer 13 can be used for other MLC flash device 14 writing and free up space in the staging buffer 13.

Figure 6:
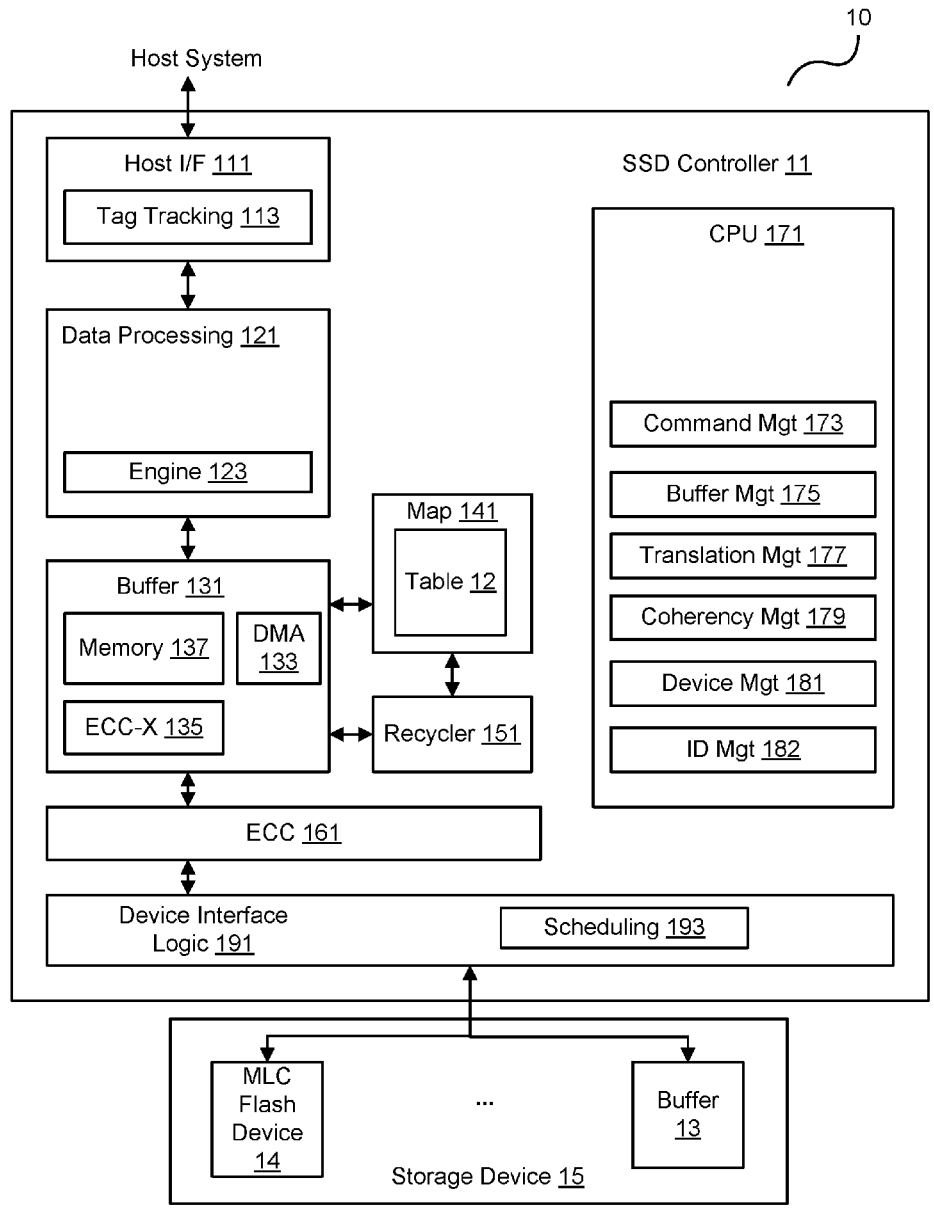
FIG. 6 is a block diagram of an exemplary storage controller and its associated storage device.
Figure 7:
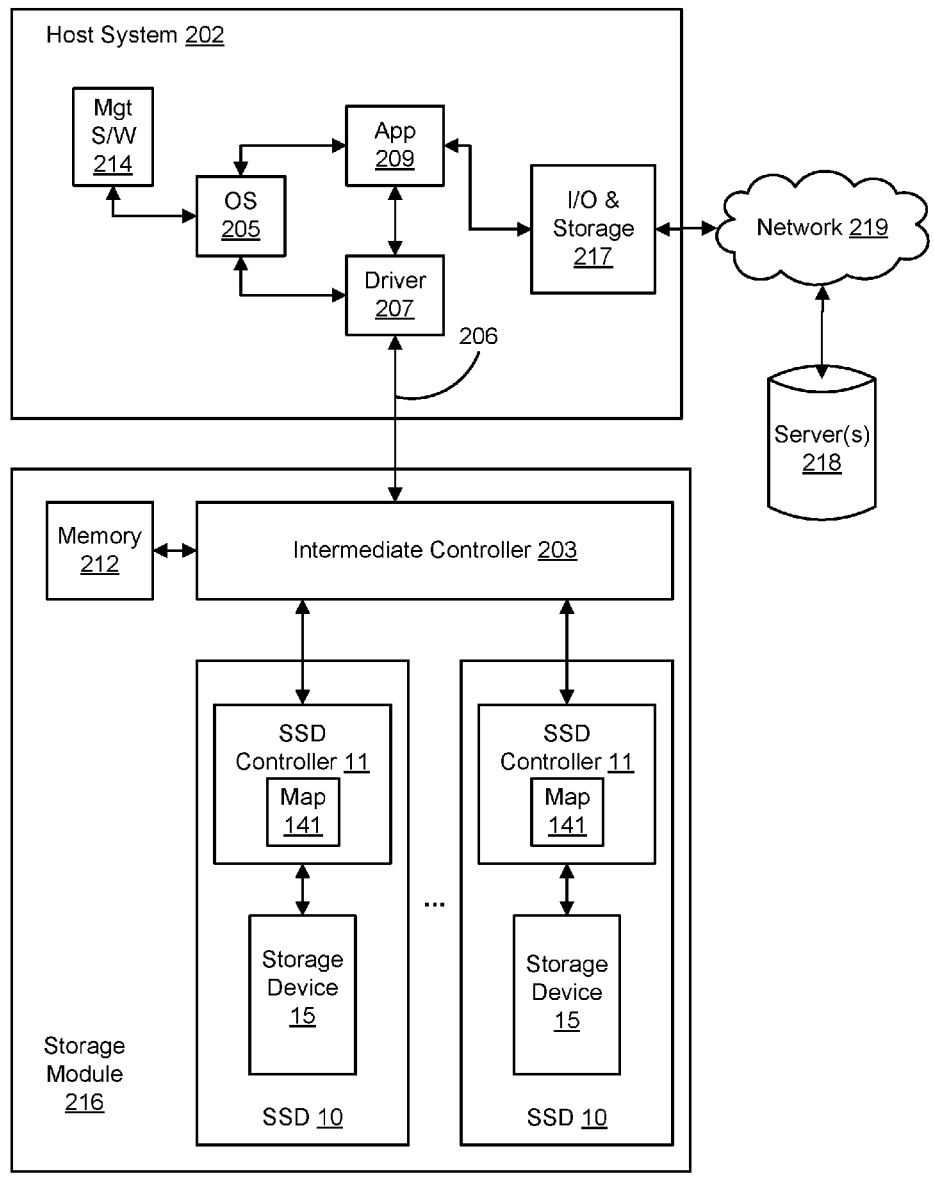
FIG. 7 is a block diagram of an I/O module comprising SSDs and their associated controllers/storage devices interfacing with a host system.

The invention can take the form of hardware, firmware, software, or a combination thereof. FIGS. 6 and 7 illustrate such a combination that may be operable to employ the systems and methods described herein. More specifically, FIG. 6 is a block diagram of an exemplary SSD 10 and its associated device controller (i.e., the SSD controller 11) and storage device 15 (e.g., the MLC flash device 14 and the buffer 13 of FIG. 1). FIG. 7 is a block diagram of a storage module 216 comprising SSDs 10 and their associated controllers 11/storage devices 15 interfacing with a host system 502.

In FIG. 6, the SSD controller 11 includes a host interface 111 that is operable to interface with a host system to communicate I/O operations of the host system. The host interface 111 may be configured with a tag tracking module 113 that is operable to track progress of individual I/O commands (e.g., read and write commands to certain addresses in the storage device 15). The tag tracking module 113 may associate an external flag of a command received from the host system with an internal flag that the SSD controller 11 can access during processing of the command to identify the status of the processing.

The SSD controller 11 also includes a data processing module 121 that comprises a processing engine 123 generally operable to perform certain tasks on data that is received from the host interface 111 or residing within a buffer 131, such as one or more of formatting the data, transcoding the data, compressing the data, decompressing the data, encrypting the data, decrypting the data, data encoding/formatting, or any combination thereof. For example, a processing engine 123 of the data processing module 121 may be operable to process the I/O operation from an I/O module of the host system generating the operation, such that the data of the I/O operation may be written to the logical address of the storage device 15. The processing engine 123 may extract the data of the write I/O command and prepare it for storage in the storage device 15. In doing so, the processing engine 123 may compress the data using any of a variety of data compression algorithms. When retrieving the data from the storage device 15, the processing engine 123 may decompress the data according to the algorithm used to compress the data for storage.

The buffer 131 is operable to store data transferred to and from the host system. The buffer 131 may also store system data, such as memory tables used by the SSD controller 11 to manage the MLC flash device 14, the buffer 13, and any possible higher-level RAID functionality in the memory 137. Other modules may include an error correcting code (ECC-X) module 135 to provide higher-level error correction and redundancy functionality, and a Direct Memory Access (DMA) module 133 to control movement of data to and from the buffer 131.

The SSD controller 11 also includes an error correction code module 161 operable to provide lower level error correction and redundancy processing of the data in the buffer 131 using any of a variety of error correction codes techniques (e.g., cyclic redundancy checks, Hamming codes, low-density parity check coders, etc.).

A device interface logic module 191 is operable to transfer data to and from the storage device 15 according to the protocol of the devices therein. The device interface logic module 191 includes a scheduling module 193 that is operable to queue I/O operations to the storage device 15.

The SSD controller 11 herein also includes a map module 141 that is operable to perform data addressing to locations in the storage device 15 according to the lookup table 12. For example, the map module 141 may use the lookup table 12 to convert logical block addresses (LBAs) from the host system to block/page addresses directed to the buffer 13, the MLC flash device 14, or both. The lookup table 12 may be stored in whole or in part in SSD controller 11 and/or in storage device 15. For example, in some embodiments a portion of the lookup table 12 may be cached in the SSD controller 11 with generally all of lookup table 12 being stored non-volatilely in the storage device 15.

A recycler 151 performs garbage collection on behalf of the SSD controller 11. For example, the recycler 151 may determine portions of the storage device 15 that are actively in use by scanning the lookup table 12 of the map module 141. In this regard, the recycler 151 may make unused, or "deallocated", portions of the storage device 15 available for writing by erasing the unused portions. The recycler 151 may also move data within the storage device 15 to make larger contiguous portions of the storage device 15 available for writing.

The SSD controller 11 also includes a CPU 171 that controls various aspects of the SSD controller 11. For example, the CPU 171 may process instructions or firmware to implement command management 173 that tracks and controls commands received from the host system. This firmware may also implement buffer management 175 that controls allocation and use of the buffer 131 and translation management 177 or to control the map module 141. The firmware may also employ coherency management 179 to control consistency of data addressing to avoid conflicts such as those that may occur between external data accesses and recycled data accesses. The firmware may also provide device management 181 to control the device interface logic module 191 and identity management 182 to control modification and communication of identity information of components within the SSD controller 11.

In FIG. 7, the host system 202 is operable to process software instructions and perform I/O operations with the storage module 216 to read from and write to one or more SSDs 10. In this regard, the host system 202 may include an operating system 205 that provides the computing environment for the host system 202. A driver 207 is operable to communicate through the link 206 to the storage module 216 to perform the I/O operations with the various SSDs 10 configured therewith.

Like other computing systems, the operating system 205 may be initiated via management software 214 (e.g., Bios software). The host system 202 may also include application software 209 to perform various computing processes on behalf of the host system 202 (e.g., word processing applications, image processing applications, etc.). The host system 202 may also include I/O and storage functionality 217 operable to conduct I/O operations with one or more servers 218 through a communication network 219 (e.g., the Internet, local area networks, wide-area networks, etc.). In this regard, the storage module 216 may act as a cache memory of I/O operations for the host system 202.

The storage module 216 may be configured with an intermediate controller 203 that is operable to switch various I/O operations of the host system 202 to LBAs of the SSDs 10. In this regard, the storage module 216 may include a memory 212 that stores mapping information for the intermediate controller 203 to conduct the I/O operations to the LBAs. The map module 141 of the SSD controller 11 may also be operable to perform data addressing with variable-sized mapping units to locations in the storage device 15 according to the lookup table 12, and convert LBAs from the host system 202 to block/page addresses directed to the storage device 15.

What is claimed is:

1. A Solid State Drive (SSD), comprising:
  a buffer;
  a multi-level cell (MLC) flash device; and
  a controller operable to write data in the buffer based on an Input/Output (I/O) request, to begin copying the data from the buffer to a block of the MLC flash device, to copy a portion of the data associated with open word lines of the block to another location in the buffer after a power cycle, and to update a lookup table for the copied portion of the data with the other location so that the copied portion of the data can be accessed via a subsequent I/O request.

2. The SSD of claim 1, wherein:
  the controller is further operable to abandon the open word lines of the MLC flash device after the power cycle until garbage collection is performed.

3. The SSD of claim 1, wherein:
  the controller is further operable to generate a pointer to the other location in the lookup table, and to direct a read I/O request for the copied portion of the data to the other location of the buffer using the pointer.

4. The SSD of claim 1, wherein:
  the controller is further operable to copy the portion of the data to another location of the MLC flash device after the power cycle.

5. The SSD of claim 4, wherein:
the controller is further operable to generate a pointer to the other location of the MLC flash device, and to direct a read I/O request for the copied portion of the data to the other location of the MLC flash device using the pointer.

6. The SSD of claim 1, wherein:
the buffer comprises a single level cell device.

7. The SSD of claim 1, wherein:
the controller is further operable to close the block of the MLC device after the power cycle, and to retain fully programmed data in the block so that the fully programmed data in the block can be accessed via a subsequent I/O request.

8. A method operable with a controller of a Solid State Drive (SSD), the method comprising:
writing data in a buffer based on an Input/Output (I/O) request;
begin copying the data from the buffer to a block of a multi-level cell (MLC) flash device;
copying a portion of the data associated with open word lines of the block to another location in the buffer after a power cycle; and
updating a lookup table for the copied portion of the data with the other location so that the copied portion of the data can be accessed via a subsequent I/O request.

9. The method of claim 8, further comprising:
abandoning the open word lines of the MLC flash device after the power cycle until garbage collection is performed.

10. The method of claim 8, further comprising:
generating a pointer to the other location in the lookup table; and
directing a read I/O request for the copied portion of the data to the other location of the buffer using the pointer.

11. The method of claim 8, further comprising:
copying the portion of the data to another location of the MLC flash device after the power cycle.

12. The method of claim 11, further comprising:
generating a pointer to the other location of the MLC flash device; and
directing a read I/O request for the copied portion of the data to the other location of the MLC flash device using the pointer.

13. The method of claim 8, wherein:
the buffer comprises a single level cell device.

14. The method of claim 8, further comprising:
closing the block of the MLC device after the power cycle; and
retaining fully programmed data in the block so that the fully programmed data in the block can be accessed via a subsequent I/O request.

15. A non-transitory computer readable medium comprising instructions that, when executed by a controller of a Solid State Drive (SSD), direct the controller to:
write data in a buffer based on an Input/Output (I/O) request;
begin copying the data from the buffer to a block of a multi-level cell (MLC) flash device;
copy a portion of the data associated with open word lines of the block to another location in the buffer after a power cycle; and
update a lookup table for the copied portion of the data with the other location so that the copied portion of the data can be accessed via a subsequent I/O request.

16. The computer readable medium of claim 15, further comprising instructions that direct the controller to:
abandon the open word lines of the MLC flash device after the power cycle until garbage collection is performed.

17. The computer readable medium of claim 15, further comprising instructions that direct the controller to:
generate a pointer to the other location in the lookup table; and
direct a read I/O request for the copied portion of the data to the other location of the buffer using the pointer.

18. The computer readable medium of claim 15, further comprising instructions that direct the controller to:
copy the portion of the data to another location of the MLC flash device after the power cycle.

19. The computer readable medium of claim 18, further comprising instructions that direct the controller to:
generate a pointer to the other location of the MLC flash device; and
direct a read I/O request for the copied portion of the data to the other location of the MLC flash device using the pointer.

20. The computer readable medium of claim 15, wherein:
the buffer comprises a single level cell device.

21. The computer readable medium of claim 15, further comprising instructions that direct the controller to:
close the block of the MLC device after the power cycle; and
to retain fully programmed data in the block so that the fully programmed data in the block can be accessed via a subsequent I/O request.

* * * * *